Patented Sept. 1, 1925.

1,552,117

UNITED STATES PATENT OFFICE.

CHARLES WILLIAM CUNO, OF WEBSTER GROVES, MISSOURI.

PROCESS OF MANUFACTURING NITRIC ACID.

No Drawing.     Application filed April 24, 1925.   Serial No. 25,691.

*To all whom it may concern:*

Be it known that I, CHARLES WILLIAM CUNO, a citizen of the United States, residing at Webster Groves, in the county of St. Louis and State of Missouri, have invented new and useful Improvements in Processes of Manufacturing Nitric Acid, of which the following is a specification.

The invention relates to the process of manufacturing nitric acid by heating nitrates in the presence of sulfuric acid and has for its object to render the process simpler, more expeditious, cheaper and more efficient.

In the usual manufacture of nitric acid from nitrates, the nitrates are heated in a closed retort with sulfuric acid, and the nitric acid fumes are condensed by suitable means. In such a process there is also formed a large volume of red fumes consisting of nitrogen peroxide. This nitrogen peroxide is difficult to oxidize to form nitric acid. It also dissolves in the nitric acid and forms objectionable nitrous acid. Under present practice these fumes have hitherto been more or less efficiently recovered by systems of absorbers, pulsometers, etc., or by absorption in caustic solutions.

Instead of such means, I prevent the formation of these red nitrogen peroxide fumes by bubbling a stream of air, oxygen, or oxygen enriched air through the heated mixture of nitrate and sulfuric acid. This bubbling may be accomplished by inserting a pipe below the surface of the mix and forcing the air or gas through it by pressure, or by suction applied at the end of the condensation system. The oxygen thus added prevents the formation of lower oxides of nitrogen.

I claim:

1. The process of manufacture of nitric acid from nitrates by bubbling a stream of air through the heated mixture of nitrates and sulfuric acid.

2. The process of manufacture of nitric acid from nitrates by a bubbling stream of oxygen through the heated mixture of nitrates and sulfuric acid.

3. The process of manufacturing nitric acid from nitrates by bubbling a stream of oxygen enriched air through the heated mixture of nitrates and sulfuric acid.

CHARLES WILLIAM CUNO.